(12) United States Patent
Blair et al.

(10) Patent No.: US 7,451,913 B2
(45) Date of Patent: Nov. 18, 2008

(54) APPARATUS, SYSTEM, AND METHOD FOR POINT OF SALE CURRENCY VERIFICATION

(75) Inventors: Brian Edward Blair, Raleigh, NC (US); Kevin Hunter Vorhees, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 10/852,825

(22) Filed: May 25, 2004

(65) Prior Publication Data

US 2006/0010041 A1   Jan. 12, 2006

(51) Int. Cl.
*G06F 17/00* (2006.01)
*G07F 19/00* (2006.01)
*G06K 15/00* (2006.01)

(52) U.S. Cl. .................. 235/375; 235/379; 235/383
(58) Field of Classification Search ................ 235/375, 235/379, 383; 705/45, 16
See application file for complete search history.

(56) References Cited

U.S. PATENT DOCUMENTS

| | | | | |
|---|---|---|---|---|
| 4,803,346 A * | 2/1989 | Lyons et al. | ................ | 235/7 R |
| 5,540,301 A | 7/1996 | Dumont | ................ | 186/61 |
| 5,712,676 A | 1/1998 | Takaki et al. | ................ | 347/262 |
| 5,865,547 A | 2/1999 | Harris et al. | ................ | 400/578 |
| 5,896,206 A | 4/1999 | Kellogg | ................ | 358/498 |
| 5,924,079 A * | 7/1999 | Brown | ................ | 705/16 |
| 5,979,753 A | 11/1999 | Roslak | ................ | 235/380 |
| 6,017,161 A | 1/2000 | Harris et al. | ................ | 400/625 |
| 6,105,011 A * | 8/2000 | Morrison, Jr. | ................ | 705/45 |
| 6,169,483 B1 | 1/2001 | Ghaffari et al. | ................ | 340/572.3 |
| 6,195,006 B1 | 2/2001 | Bowers et al. | ................ | 340/572.1 |
| 6,243,504 B1 | 6/2001 | Kruppa | ................ | 382/318 |
| 6,370,271 B2 | 4/2002 | Fu et al. | ................ | 382/217 |
| 6,473,519 B1 * | 10/2002 | Pidhirny et al. | ................ | 382/140 |
| 7,000,828 B2 * | 2/2006 | Jones | ................ | 235/379 |
| 7,182,249 B2 * | 2/2007 | Johannesson et al. | ................ | 235/375 |
| 2004/0061913 A1 * | 4/2004 | Takiguchi | ................ | 358/524 |

* cited by examiner

*Primary Examiner*—Steven S Paik
*Assistant Examiner*—April A Taylor
(74) *Attorney, Agent, or Firm*—Kunzler & McKenzie (57) ABSTRACT

The apparatus for point of sale currency verification includes a point of sale check printer having a printing device configured to print information on first and second opposing faces of a document, a scanning device configured to scan the first and second faces of the document, a verification module configured to verify the authenticity of the document, and a retention area that is secure, coupled to the apparatus, and configured to retain the document until removed by an authorized person. The document may be a check or currency. The method includes printing information on first and second opposing faces of a document, scanning the first face of the document, verifying the authenticity of the document, and retaining the document until removed by an authorized person.

30 Claims, 7 Drawing Sheets

APPARATUS, SYSTEM, AND METHOD FOR POINT OF SALE CURRENCY VERIFICATION

BACKGROUND OF THE INVENTION

1. Field of the Invention

This invention relates to point of sale check printers and more particularly relates to point of sale check printers having currency authentication and acceptance systems.

2. Description of the Related Art

In ongoing attempts to provide more efficient and convenient service to customers, many retailers have begun to use "point of sale check printers" to reduce the time required for a customer to manually fill out and sign a check. Most people have encountered delays at checkout lines when another customer waits until all of his or her items are checked or scanned to begin to fill out a check for the total purchase. Faster service is provided if the retailer uses a point of sale check printer. A point of sale check printer automatically enters the date, amount of purchase and the name of the retail establishment in the proper spaces on a check, leaving only the signature line blank for the customer to sign. The process of paying by check is therefore made similar to a purchase by credit card, in which all information regarding the date, the amount of the sale and the name of the retail establishment is provided for the customer, who then needs only to sign a receipt to complete the transaction.

A major difference between a credit card purchase and a check purchase, however, is the need for the back of a check to be endorsed, or "franked" by the retail establishment. This step is not required at the point of sale, but, for security reasons, many retail establishments which use a point of sale check printer have a practice of franking each check (with "for deposit only" or other similar notation) as it is received. This lessens the possibility of unrecoverable losses from stolen checks which are later stamped or printed with forged endorsements.

Because the standard location for endorsing or franking a check is on the back, and the standard location for providing all other information is on the front, any check processed by a point of sale check printer must be printed on both sides before such a check may be accepted as payment. Thus, the check must be removed and reinserted to the point of sale printer for information to be printed on both sides.

It is known in the art to encode data on a check with Magnetic Ink Character Recognition ("MICR") technology. In MICR technology, magnetic ink is used to print the customer's account number, a number identifying the bank, and the actual check number on each check. MICR reading machines read this information during the check clearing process to insure the proper account is charged with the amount for which the check is drawn.

Current point of sale check printers are able to read MICR encoding on the check and transmit the encoded data to credit verification agencies. After the information regarding the customer's bank and account number is transmitted to the credit verification agency, a decision may then be made by the retailer whether to accept the presented check. The verification step is not necessary, as some point of sale check printers merely read and record the MICR-encoded data. To use a current point of sale check printer, a cashier inserts the check for reading and verification. After the MICR is read and any verification or approval completed, the back of the check is endorsed or franked.

As previously referred to, all point of sale check printers require that the check be manually removed from the printer and then re-inserted to print the date, the name of the retail establishment and the amount in numeral and word form on the face of the check. This step requires the attention of the cashier, who is thereby temporarily prevented from accomplishing another task such as "bagging" the purchased items. The check must be correctly oriented during the re-insertion, or the information printed on the face will be printed in the wrong places, rendering the check unusable. If the check is rendered unusable, the customer would be asked for a replacement check, which would lessen the customer's confidence in the retail establishment and the check printing process. Also, the interval in which a check is endorsed but not filled out on the face presents a security risk to the customer, who may not want a "blank" check to be out of his or her control. If the check is held in the point of sale printer for a length of time for verification, the cashier may become distracted or may get involved with other tasks. The cashier's attention would have to be regained when the franking step is completed and the check is ready for reinsertion. Until the cashier's attention is redirected to the point of sale printer, the check could be removed by an unauthorized party.

In order to overcome the requirement of the cashier's attention, point of sale check printers have been equipped with mechanisms for ensuring the endorsement and all data on the front of the check are correctly printed. This has been achieved with the addition of a document flipping mechanism for scanning and printing both sides of the check. With a document flipping mechanism, the check is scanned on one side, flipped, and scanned on the second side without having to remove and reinsert the check. The printing mechanism likewise may print on both sides of the check without removing and reinserting the check.

Point of sale check printers have decreased the wait time for customers, however, the cashier's attention is still required when handling currency. With the proliferation of counterfeit currency, many times a cashier is required to inspect currency for authenticity. Solutions for authenticating currency range from low tech currency markers, to currency scanning devices. Each solution, however, requires either cashier intervention or a separate device. What is needed is a point of sale printer that completes the steps of currency authentication on both sides of the currency, and currency retention once authenticated. Such a printer would ideally accept paper currency, scan and authenticate both sides of the currency using a document flipping mechanism, and route the currency to a document retention area.

SUMMARY OF THE INVENTION

The present invention has been developed in response to the present state of the art, and in particular, in response to the problems and needs in the art that have not yet been fully solved by currently available point of sale check printers. Accordingly, the present invention has been developed to provide a process, apparatus, and system for currency verification that overcome many or all of the above-discussed shortcomings in the art.

The apparatus for currency verification is provided with a logic unit containing a plurality of modules configured to functionally execute the necessary steps of currency verification. These modules in the described embodiments include a printing device configured to print information on first and second opposing faces of a document, a scanning device configured to scan the first face of the document, a verification module configured to verify the authenticity of the document, and a retention area that is secure, coupled to the apparatus, and configured to retain the document until removed by an authorized person.

In one embodiment, the apparatus may also comprise a control module configured to selectively route the document within the apparatus, and a document flipper assembly configured to reverse the orientation of the document with respect to the apparatus. In a further embodiment, the apparatus comprises a gate configured to respond to the control module and selectively bi-directionally transport the document along a first path. The apparatus is configured to scan the first face of the document, send the document to the document flipper assembly, receive the reversed document from the document flipper assembly, and scan the second face of the document.

In a further embodiment, the scanning device may be configured to send a digital representation of the document to the verification module in order to verify the authenticity of the document.

The present invention may also include a system for currency verification. In one embodiment, the system includes a communications network, a point of sale check printer coupled to the network and having a printing device, a scanning device, a verification module, and a retention area, and a change delivery device coupled to the network and configured to return change to a customer.

A computer readable storage medium may also be provided. In one embodiment, the computer readable code is configured to carry out a method for currency verification. The method may comprise printing information on first and second opposing faces of a document, scanning the first face of the document, verifying the authenticity of the document, and retaining the document. Additionally, the method may include selectively routing the document, scanning the second face of the document, and reversing the orientation of the document. In a further embodiment, the computer readable medium may comprise code configured to carry out a method of sending a digital representation of the document to a verification module.

An apparatus for currency verification of the present invention is presented. The apparatus may comprise means for printing information on first and second opposing faces of a document, means for scanning the first face of the document, means for verifying the authenticity of the document, and means for retaining the document.

A process of the present invention is also presented for currency verification. The process in the disclosed embodiments substantially includes the steps necessary to carry out the functions presented above with respect to the operation of the described apparatus and system. In one embodiment, the process includes inputting a document, initiating a verification sequence, verifying the authenticity of the document, and retaining the document Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
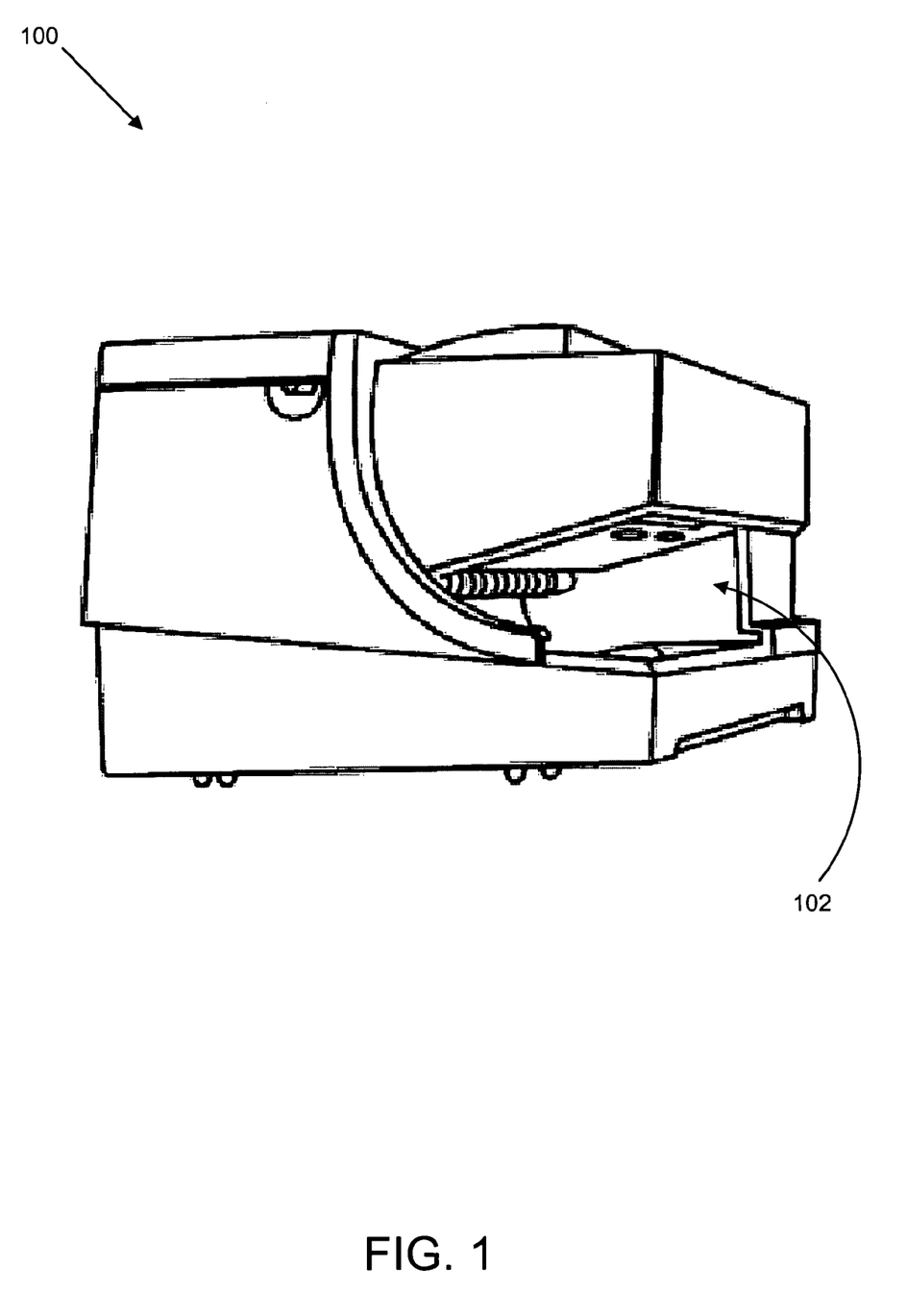
FIG. 1 illustrates one embodiment of a side and front perspective view of a point of sale check printer having a scanning device for scanning currency in accordance with the present invention.

FIG. 1 depicts a side and front perspective view of a point of sale check printer 100 having a scanning device for scanning currency in accordance with the present invention. The point of sale check printer 100 has a document loader 102 configured to receive and feed a document into the point of sale check printer 100 in order to process a transaction. In one embodiment, the document may comprise a check. Alternatively, the point of sale check printer 100 may be configured to process currency or other legal tender. One example of a point of sale check printer suitable for use with the present invention is described in U.S. Pat. No. 6,017,161, which is hereby incorporated by reference into this document.

Figure 2:
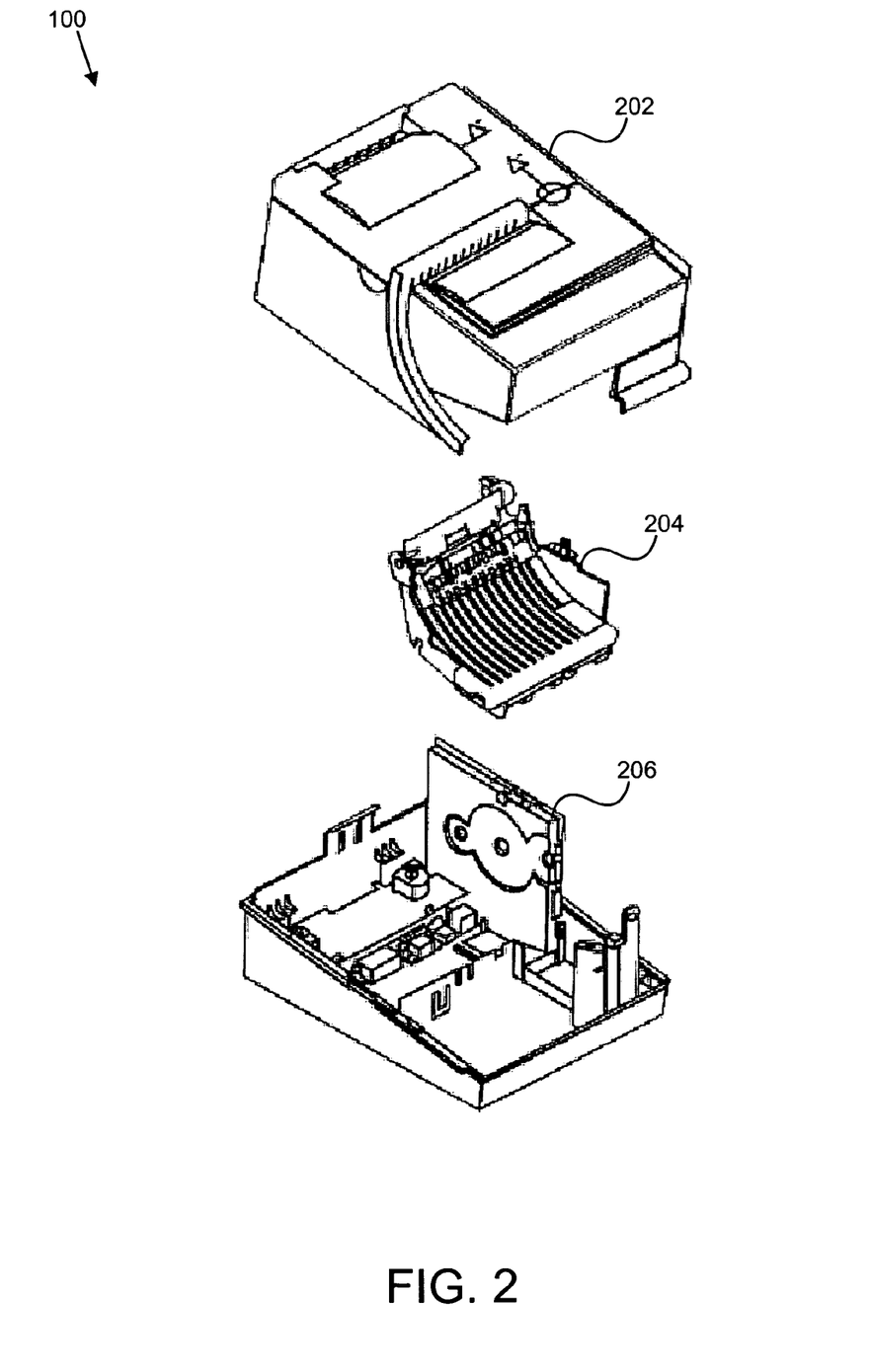
FIG. 2 is an exploded view of one embodiment of a point of sale check printer having a scanning device for scanning currency in accordance with the present invention.

FIG. 2 is an exploded perspective view of the point of sale check printer 100. The point of sale check printer 100 may comprise an upper housing 202, an inner assembly 204, and a lower housing 206. In one embodiment, the lower assembly 204 may comprise a document retention area (not shown) configured to retain a plurality of documents until retrieved by an authorized person. The document retention area will be discussed in greater detail below with reference to FIG. 3.

Figure 3:
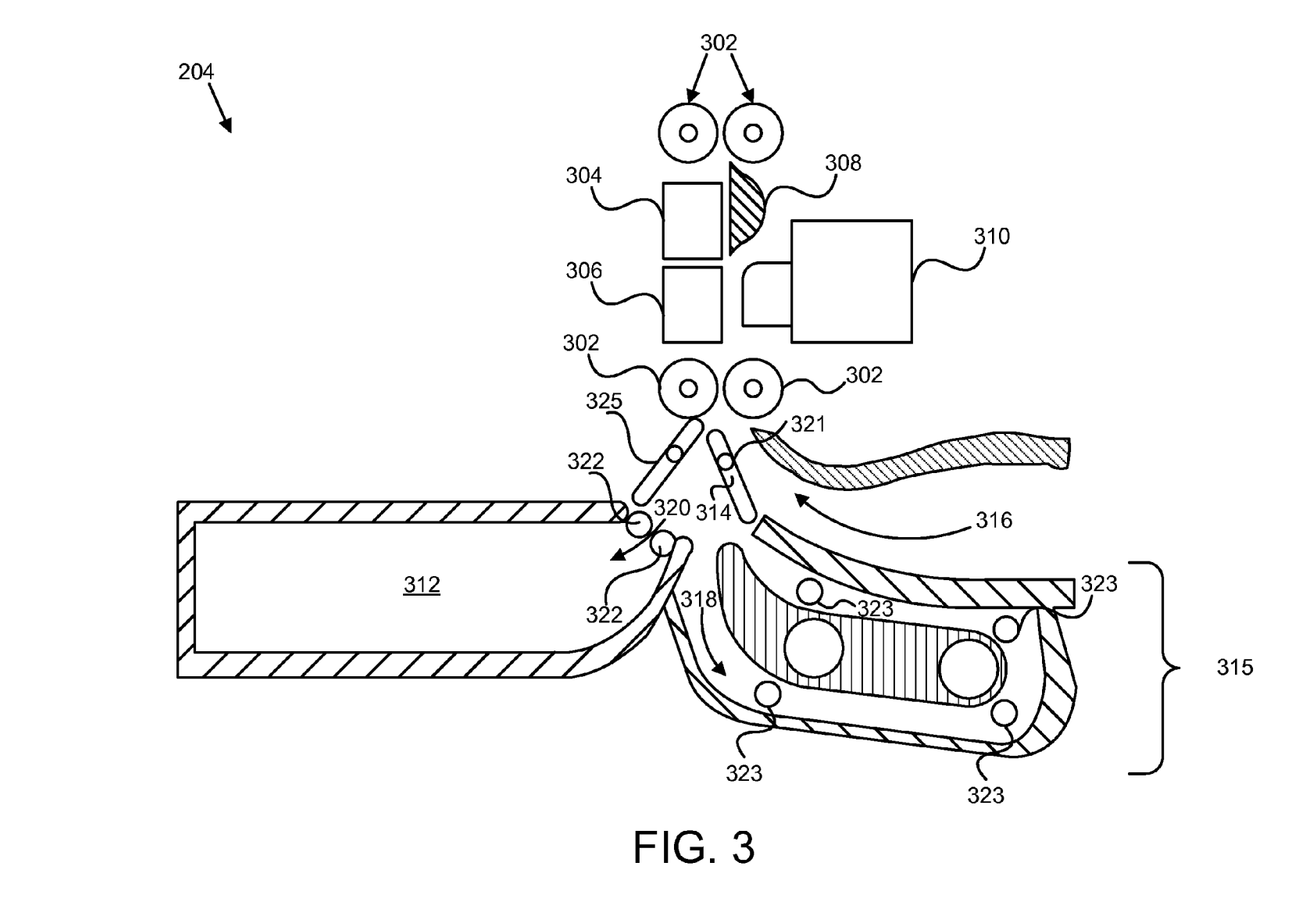
FIG. 3 is a schematic block diagram illustrating one embodiment of a check printing and currency scanning device having a currency retention area in accordance with the present invention.

FIG. 3 is a schematic block diagram graphically illustrating one embodiment of the inner assembly 204 configured to scan and retain currency in accordance with the present invention. The inner assembly 204 may comprise the document loader 102, a plurality of rollers 302, an optical scanner 304, a platen 306, a paper guide 308, a print head 310, a document retention area 312, a gate 314, and a document flipping device 315. A plurality of document paths 316, 318, 320 may be defined by the position of the gate 314. In one embodiment, the gate 314 is rotatably coupled about a pin 321 and configured to define either a document processing path 316, a document flipping path 318, or a document retention path 320. Additionally, a gate 325 may be rotatably coupled and configured to selectively route the document. In one embodiment, the gates 314 and 325 function in concert to route documents to the document paths 316, 318, 320.

The point of sale check printer 100 is configured to receive a document along the document processing path 316, and transport the document upwards toward the optical scanner 304. In one embodiment, the optical scanner 304 may be configured to scan the document and translate optical information into a format usable by computers or other devices. In a further embodiment, the optical scanner 304 may be configured to interpret Magnetic Ink Character Recognition (MICR) encoded documents. Upon scanning one face of the document, the gate 314 may be rotated to direct the document on the document flipping path 318 through the document flipping device 315.

In one embodiment, the document flipping path 318 may be circular and comprise a plurality of idler wheels 323. The idler wheels 323 and rollers 302 may have circumferential surfaces of rubber, soft plastic or the like. Document flipping devices 315 are well known in the art and require no further discussion herein. Once the document has been flipped, rollers 302 transport the document upwards toward the optical scanner 304, and the optical scanner 304 scans the second face of the document. The gate 314 may then rotate and define the document retention path 320. Document retention rollers 322 are configured to receive the document and transport the document into the document retention area 312.

Figure 4:
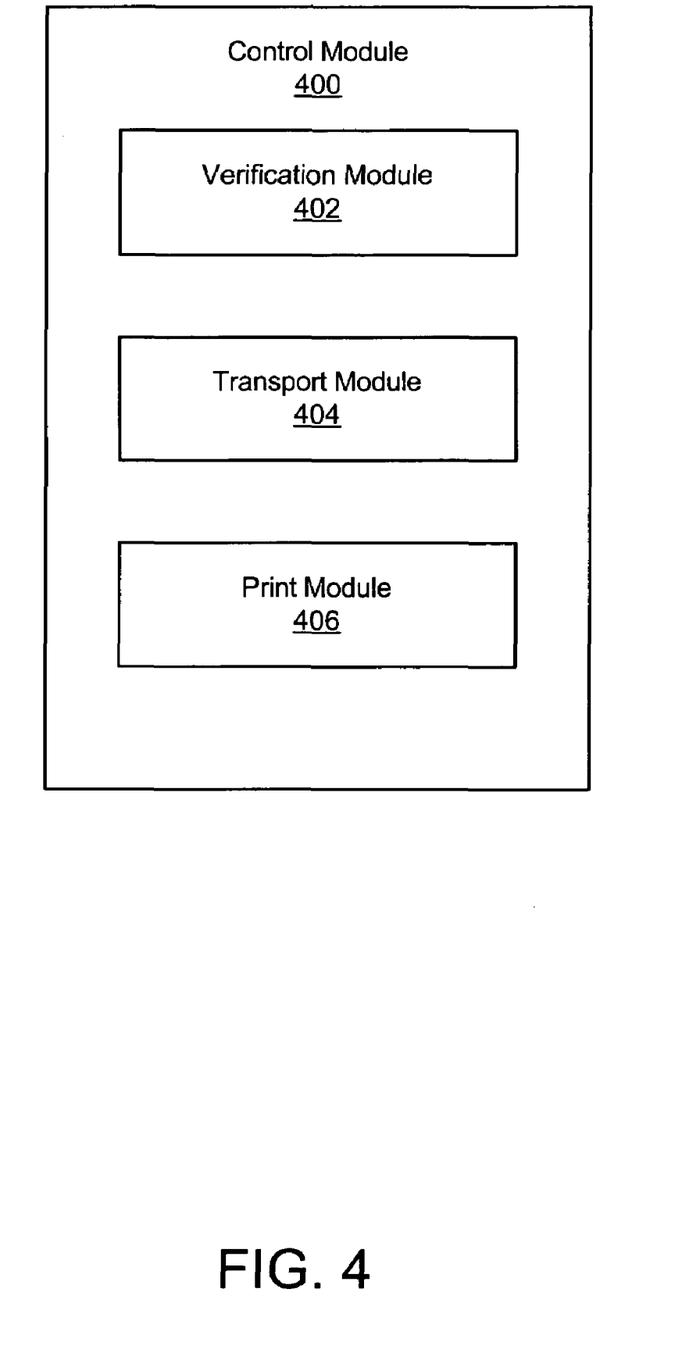
FIG. 4 is a schematic block diagram illustrating one embodiment of a control module for controlling a point of sale check printer in accordance with the present invention.

FIG. 4 is a schematic block diagram graphically illustrating one embodiment of a control module 400 in accordance with the present invention. The control module 400 may be configured to control the point of sale check printer 100. In one embodiment, the control module 400 comprises a verification module 402, a transport module 404, and a print module 406. The verification module 402 is configured to receive digital document information from the optical scanner 304. The verification module 402 may implement well known currency pattern recognition algorithms in order to verify document authenticity and value. Alternatively, the verification module 402 may be configured with proprietary pattern recognition algorithms.

Upon receiving digital document information, the verification module 402 may alternatively be configured to communicate with a verification server over a communications network, such as the Internet. The transport module 404 is configured to control the rollers 302, idler wheels 323, and document retention rollers 322. In one embodiment, the transport module 404 is configured to initialize roller 302, 322 movement, pause roller 302, 322 movement, and reverse roller 302, 322 direction. By controlling the direction (clockwise or counterclockwise) of roller 302, 322 movement, the transport module 404 may control the orientation and path of the document. Additionally, the transport module 404 may be configured to control the position of the gate 314.

In one embodiment, the print module 406 is configured to print information on the document. For example, the print module 406 may direct the printhead 310 to print information such as "for deposit only" on one side of the document. In a further embodiment, if the document comprises currency, the print module 406 remains idle as no printing is required in the authentication and retention of currency. However, the print module 406 may be configured to control the printhead 310 in applying a currency verification ink to the currency.

Figure 5:
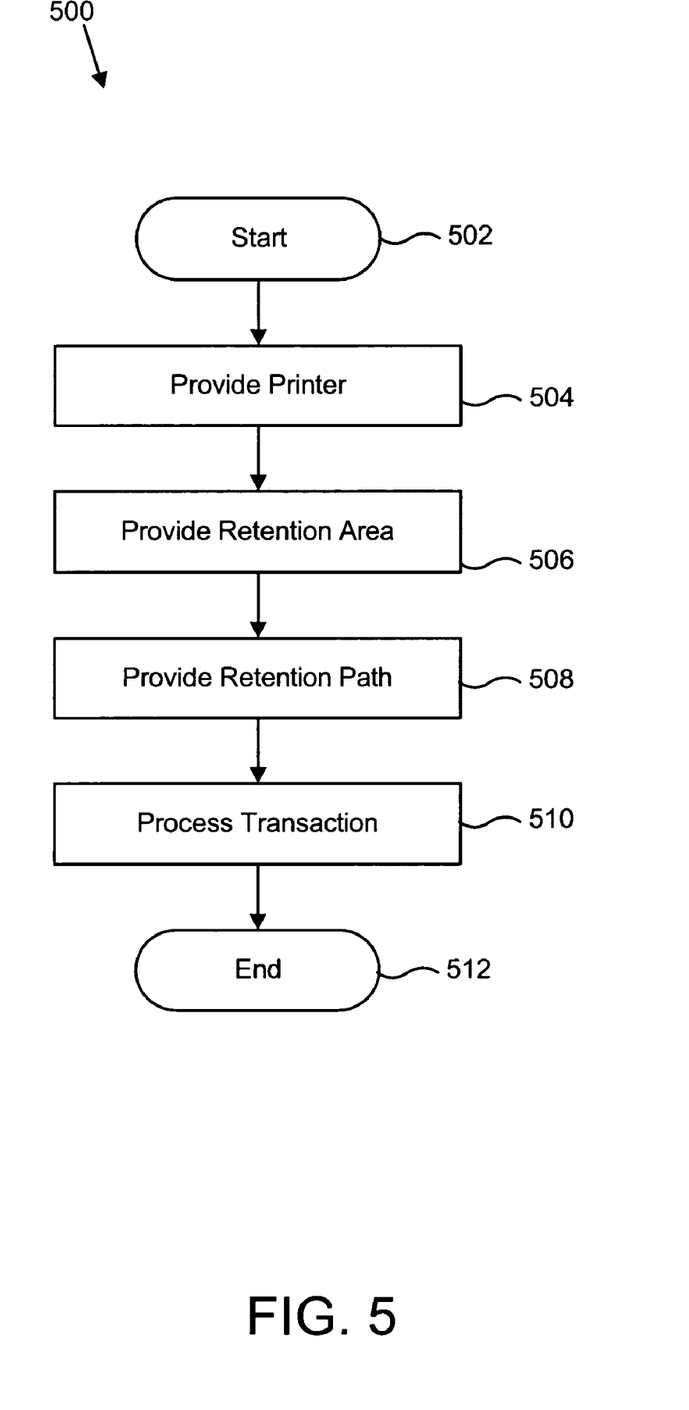
FIG. 5 is a schematic flow chart diagram illustrating one embodiment of a method for currency verification in accordance with the present invention.

FIG. 5 is a schematic block diagram illustrating one embodiment of a method 500 for currency verification. The method 500 starts 502 and a point of sale check printer 100 is provided 504. In one embodiment, the point of sale check printer 100 comprises a two station printer having a formal printer mechanism to print receipts and an opening 102 for receiving and printing on checks. One such point of sale check printer is shown in U.S. Pat. No. 5,865,547, which is hereby incorporated by reference into this document. A document retention area 312 is then provided 506 and incorporated into the point of sale check printer 100. A gate 314 is provided 508 and configured to define a plurality of document paths, at which point a transaction may be processed 510.

Figure 6:
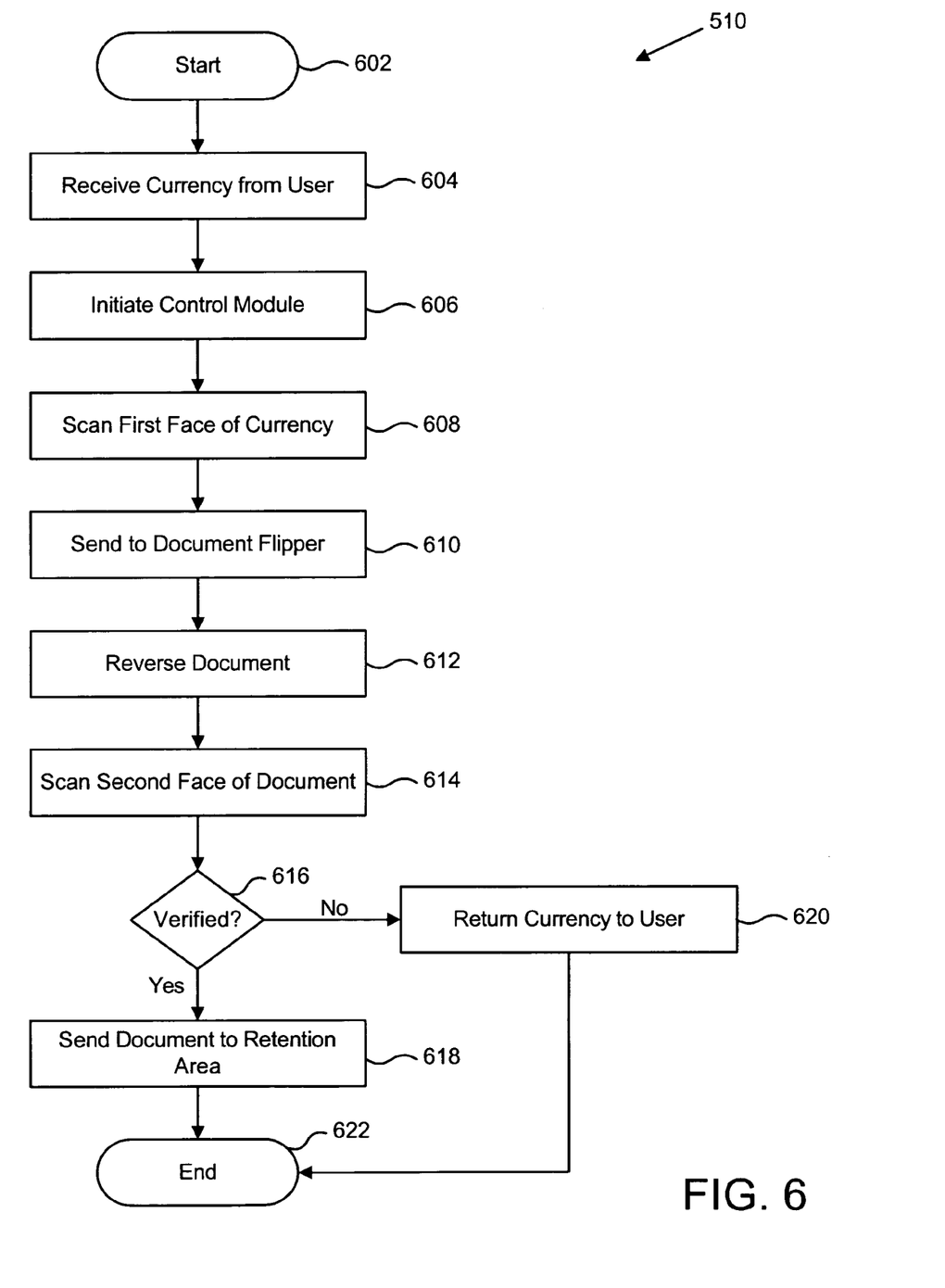
FIG. 6 is a schematic flow chart diagram illustrating one embodiment of a method for processing a transaction in accordance with the present invention.

FIG. 6 is a schematic block diagram illustrating one embodiment of a method 510 for processing a transaction in accordance with the present invention. The method 510 starts 602 and a document is received 604. In one embodiment, the document may be currency. The point of sale check printer 100 then initiates 606 the control module 400. The control module 400 may then activate rollers 302 and direct the document towards the optical scanner 304. In a further embodiment, the optical scanner 304 scans 608 a first face of the document and translates the optical information into a computer usable format.

The transport module 404 then reverses the direction of the rollers 302, rotates the gate 314, and sends 610 the document to the document flipping device 315. The document flipping device 315 reverses 612 the orientation of the document by directing the document along the circular document flipping path 318. Once reversed 612, the transport module 404 may then direct the document to the optical scanner 304, and the optical scanner 304 scans the second face of the document. Upon scanning both faces of the document, the optical scanner transmits the computer usable optical information to the verification module 402 to be verified 616.

In one embodiment, if the document is verified 616, the transport module 404 reverses the direction of the rollers 302, rotates the gate 314 to define the document retention path 320, initiates the document retention rollers 322, and sends 618 the document to the document retention area 312. If the document fails 616 verification, the transport module rotates the gate to define the document processing path 316, reverses the direction of the rollers 302, and returns 620 the document to the customer. The method 510 then ends 622.

Figure 7:
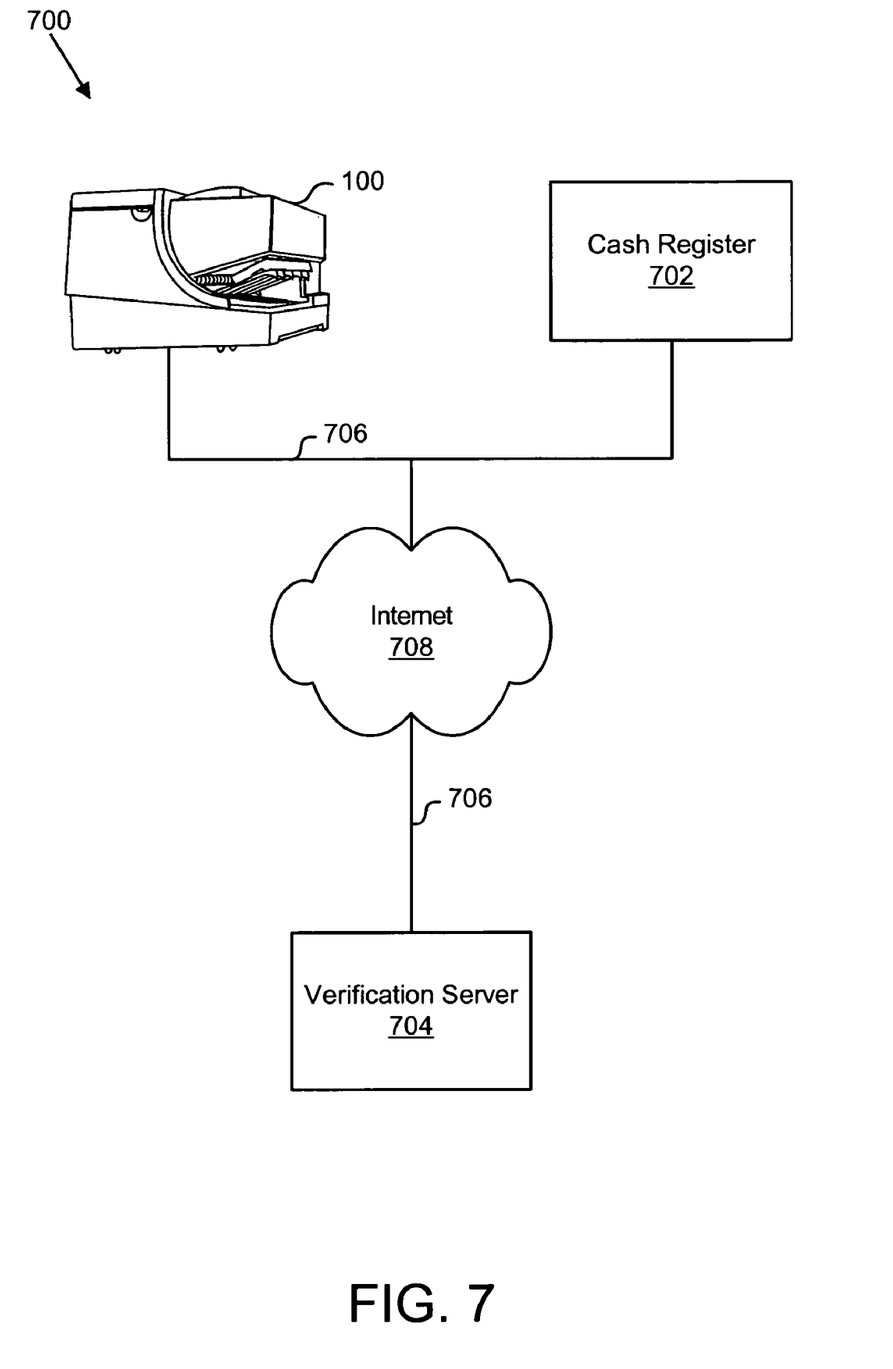
FIG. 7 is a schematic block diagram illustrating one embodiment of a system for processing a transaction in accordance with the present invention.

FIG. 7 is a schematic block diagram graphically illustrating one embodiment of a system 700 for processing a transaction in accordance with the present invention. In one embodiment, the system 700 may comprise the point of sale check printer 100, a cash register 702, and a verification server 704. The cash register 702 may be configured as a standard cash register requiring a cashier to handle transactions and return change to customers. Alternatively, the cash register 702 may comprise a self-checkout style cash register requiring no cashier intervention and configured to automatically return change to customers. The cash register 702 is configured to interface with the point of sale check printer 100 over a communications channel 706.

In one embodiment, the communications channel 706 comprises a Local Area Network (LAN). Alternatively, the communications channel 706 may comprise a communications network such as a WAN, WLAN, VPN, VLAN, or the like. In a further embodiment, the communications channel 706 may comprise a connection configured to communicate over the Internet 708. The cash register 702 may initiate communications with the point of sale check printer 100, and inform the point of sale check printer 100 of an impending transaction. Once a document is inserted into the point of sale check printer 100, the document is processed as described above with reference to FIGS. 5 and 6.

Upon processing the document, the point of sale check printer 100 may be configured to return success or failure codes to the cash register 702. Alternatively, the point of sale check printer 100 and the cash register may be implemented in a single stand alone device. In one embodiment, the point of sale check printer 100 is configured to communicate with the verification server 704. In a further embodiment, the verification server 704 comprises a server configured to verify available funds of checking accounts and return the verification to the point of sale check printer 100. The point of sale check printer 100, the cash register 702, and the verification server 704 may, alternatively, be located within a common network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A point of sale check printing apparatus, the apparatus comprising:
   a printing device configured to print information on first and second opposing faces of a document;
   a scanning device configured to scan the first face of the document;
   a verification module configured to verify the authenticity of the document in response to the scanning device scanning the first face of the document, the verification module verifying authenticity of the document from information on the first face of the document;
   an enclosed retention area that is secure, disposed within the apparatus, and configured to prevent unauthorized removal of the document; and
   a transport module configured to automatically route the document to the enclosed retention area in response to the verification module verifying the authenticity of the document.

2. The apparatus of claim 1, wherein the transport module is further configured to automatically return the document to a location accessible to a customer in response to the verification module failing to verify the authenticity of the document.

3. The apparatus of claim 1, wherein the scanning device is further configured to scan the second face of the document.

4. The apparatus of claim 1, further comprising a document flipper device configured to reverse the orientation of the document with respect to the apparatus.

5. The apparatus of claim 4, wherein the document-flipper device further comprises a plurality of gates configured to respond to a control module and route the document to one of a plurality of paths.

6. The apparatus of claim 1, wherein the printing device prints information on the first face of the document in response to the verification module verifying the authenticity of the document, the printing device printing information on the document prior to the transport module routing the document to the enclosed retention area.

7. The apparatus of claim 1, wherein the scanning device is configured to scan the first face of the document, send the document to a document flipper device, receive the reversed document from the document flipper device, and scan the second face of the document, wherein the verification module verifies authenticity of the document in response to the scanning device scanning the second face of the document, the verification module further configured to verify the authenticity of the document based on information from the first face and the second face of the document.

8. The apparatus of claim 7, wherein the verification module is configured to receive the digital representation of the document and verify the authenticity of the document.

9. The apparatus of claim 7, wherein the document comprises a check.

10. The apparatus of claim 7, wherein the enclosed retention area is secured with a lock.

11. The apparatus of claim 1, wherein the scanning device is configured to send a digital representation of the document to the verification module.

12. The apparatus of claim 1, further comprising a retention path disposed within the apparatus and configured to internally route the document to the retention area.

13. A system for currency verification, the system comprising:
- a communications network;
- a point of sale check printer coupled to the network and having:
  - a printing device configured to print information on first and second opposing faces of a document;
  - a scanning device configured to scan the first face of the document;
  - a verification module configured to verify the authenticity of the document in response to the scanning device scanning the first face of the document, the verification module verifying authenticity of the document from information on the first face of the document;
  - an enclosed retention area that is secure and disposed within the point of sale check printer and configured to prevent unauthorized removal of the document;
  - a transport module configured to automatically route the document to the enclosed retention area in response to the verification module verifying the authenticity of the document; and
- a change delivery device coupled to the network and configured to return change to a customer.

14. The system of claim 13, wherein the change delivery device further comprises a cash register.

15. The system of claim 13, wherein the transport module is further configured to automatically return the document to a location accessible to a customer in response to the verification module failing to verify the authenticity of the document.

16. The system of claim 13, wherein the point of sale check printer further comprises a document flipper device configured to respond to a control module and reverse the orientation of the document with respect to the apparatus.

17. The system of claim 16, wherein the document flipper assembly further comprises a plurality of gates configured to respond to the control module and route the document to one of a plurality of paths.

18. The system of claim 13, wherein the point of sale check printer further comprises a document transport apparatus configured to respond to a control module and selectively transport the document between the printing device, the scanning device and the enclosed retention area.

19. A point of sale check printing apparatus, the apparatus comprising:
- a printing device configured to print information on first and second opposing faces of a document;
- a scanning device configured to scan the first face of the document;
- a verification module configured to verify the authenticity of the document in response to the scanning device scanning the first face of the document, the verification module verifying authenticity of the document from information on the first face of the document;
- an enclosed retention area disposed within the apparatus and configured to prevent unauthorized removal of the document;
- a control module configured to selectively route the document within the apparatus;
- a document flipper device configured to reverse the orientation of the document with respect to the apparatus; and
- a document transport apparatus configured to respond to the control module and selectively transport the document between the printing device, the scanning device and the enclosed retention area in response to the verification module verifying authenticity of the document.

20. A computer readable storage medium comprising computer readable code configured to carry out a method for currency verification, the method comprising:
- printing information on first and second opposing faces of a document;
- scanning the first face of the document;
- verifying the authenticity of the document from information on the first face of the document in response to the scan of the first face of the document;
- automatically routing the authenticated document to an enclosed retention area in response to verifying the authenticity of the document; and
- preventing unauthorized removal of the document by retaining the document in the enclosed retention area.

21. The computer readable storage medium of claim 20, wherein the method further comprises selectively routing the document.

22. The computer readable storage medium of claim 20, wherein the method further comprises scanning the second face of the document.

23. The computer readable storage medium of claim 20, wherein the method further comprises reversing the orientation of the document.

24. The computer readable storage medium of claim 20, wherein the method further comprises selectively transporting the document between a printing device, a scanning device and the enclosed retention area.

25. The computer readable storage medium of claim 20, wherein the method further comprises scanning the first face of the document, sending the document to a document flipper device, receiving the reversed document from the document flipper device, and scanning the second face of the document.

26. The computer readable storage medium of claim 20, wherein the method further comprises sending a digital representation of the document to a verification module.

27. The computer readable storage medium of claim 20, wherein the method further comprises receiving the digital representation of the document and verifying the authenticity of the document.

28. An apparatus for currency verification, the apparatus comprising:
- means for printing information on first and second opposing faces of a document;
- means for scanning the first face of the document;
- means for verifying the authenticity of the document from information on the first face of the document in response to scanning the first face of the document;
- means for automatically routing the authenticated document to an enclosed retention area disposed within the apparatus in response to verifying the authenticity of the document; and
- means for preventing unauthorized removal of the document by retaining the document in the enclosed retention area.

29. The apparatus of claim 28, further comprising means for scanning the second face of the document.

30. A method for currency verification, the method comprising:

inputting a document;

scanning the document;

initiating a verification sequence;

verifying the authenticity of the document from information on the first face of the document in response to scanning the document; and preventing unauthorized removal of the document by automatically routing the authenticated document into an enclosed retention area and retaining the document in the enclosed retention area in response to verifying the authenticity of the document.

* * * * *